3,367,743
REFRACTORY PRODUCTS
Ben Matchen, Niagara Falls, Ontario, Canada, assignor to Norton Company, Worcester, Mass., a corporation of Massachusetts
No Drawing. Filed Mar. 20, 1961, Ser. No. 96,681
15 Claims. (Cl. 23—204)

This invention relates to refractory products. More particularly, this invention relates to refractory products in a coarse light weight form and to a method for producing the same.

It has been known to form highly refractory metallic material such as zirconium boride and zirconium carbide from zirconium oxide. However, to form these materials, it has been considered essential that the oxide and other reactants be in a finely divided form in order to achieve intimate contact therebetween. Reducing the material, and especially the oxide, to such finely divided form is difficult and time-consuming and adds to the final total cost of production. Also, this procedure results in the admission of impurities such as iron by virtue of the preparation step in which the materials are rolled or ball-milled. The refractory material which is the product of reaction of these finely divided reactants is also generally in a finely divided form and is therefore difficult to utilize in certain processes. The preparation of a coarse grade product using finely divided raw materials cannot be achieved without using a high reaction temperature, thereby risking the possibility of producing a molten mass during the hottest part of the reaction and of damaging the product container and other furnace components. The preparation of desired grit sizes is therefore difficult and costly.

It has also been proposed to pelletize a mixture of the finely divided reactants to achieve intimate and permanent contact. However, the resulting product is a hard sintered material which must be subsequently broken up into smaller particles. This is achieved only with great difficulty and with the attendant danger of introduction of impurities as described above.

It is therefore an object of this invention to provide a coarse grade of metallic refractory products in which the limitations of the prior art are avoided.

It is another object of this invention to provide a light weight metallic refractory product in a form useful for example as an insulating material which may be used at temperatures higher than existing commercial insulating materials.

It is a further object of this invention to provide a method for the production of such light weight metallic refractory products.

It is still another object of this invention to provide zirconium boride and zirconium carbide in the form of hollow shells or bubbles.

It is a still further object of this invention to provide a method for the production of zirconium boride and zirconium carbide in the form of hollow shells or bubbles.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that the above objects may be attained by preparing the refractory oxide for reaction in the form of hollow shells or bubbles. One method for the production of such materials in described in United States Patent No. 2,656,278 in which hollow shells of zirconium oxide are formed. In this patent, hollow spheres or hollow oblate spheroids having openings therein breaking the otherwise perfect shells are produced by quenching molten zirconium oxide in a high velocity stream of water. While these hollow shells are ideally suited to the process of this invention, it is to be understood that hollow shells or bubbles produced by any known method are also suitable. These materials are hereinafter referred to as bubbles.

It has been found that bubbles of zirconia may be converted to other zirconium refractory materials such as zirconium boride and zirconium carbide using substantially the same mixture and reaction conditions normally used for converting finely divided zirconia to said finely divided zirconium refractory products. It has also been found that the reactions may be conducted in a batch process or a continuous process, the reaction product being still in the form of bubbles. The bubbles are conveniently restricted in size to those which will pass through a 6 mesh per inch screen (herein after referred to as T6).

More particularly, and with reference to the production of zirconium boride, I have found that a mixture of zirconium oxide bubbles, together with a source of boron and a source of carbon, may be heated at a temperature between about 2000° and 2300° C. for from about 5 to 8 hours. The source of boron may be selected from boron carbide, boric oxide or a mixture thereof and the source of carbon may be selected from petroleum coke, zirconium carbide or a mixture thereof. The reaction may be conducted in a batch process, for example in a high frequency furnace. After bringing the furnace to temperature, the mixture is heated at the temperatures and for the times described above. The reaction may also be conducted in a continuous process in a kiln having a hot zone measuring approximately 50 inches in length. The mixture is passed through the hot zone having the temperatures noted above at a rate varying from 6 to 10 inches per hour. In each procedure, the product of the zirconium boride is of substantial purity and still in the form of bubbles.

In the following examples and throughout the specification and claims, all parts are by weight unless otherwise specified. Also, screen sizes of reactants and products are referred to, for example, as T6 on 72 and may be read through 6 mesh onto 72 mesh. This is for convenience, especially in the examples and tables.

Example 1

Mixture:                                   Parts by weight
   Zirconium oxide bubbles _____ 74
   Boron carbide (technical grade) _____ 22
   Petroleum coke _____ 4

An intimate mixture was prepared of the above ingredients. The mixture was placed in a graphite container and heated in a tray kiln at a temperature of 2200° C. for 6 hours. The resulting $ZrB_2$ bubble product analyzed:

|  | Percent |
|---|---|
| Zr | 77.19 |
| B | 20.37 |
| C | 1.12 |
| Fe | 0.22 |
| Ti | 0.35 |
| Total | 99.25 |
| Zr+B | 97.56 |

Example 2

| Kiln Feed | Pounds | Percent |
|---|---|---|
| Zirconium oxide bubbles | 121¾ | 72.0 |
| Boron carbide (technical grade) | 32½ | 19.2 |
| Petroleum coke | 10¾ | 6.4 |
| Boric oxide | 4 | 2.5 |
| Total | 169 | 100.0 |

Since the boron carbide does not always have the same boron and carbon contents, and since the coke does not always have the same fixed carbon content, the preferred weight ratio of Zr to B to C in the reactants is 5.10 to 1.00 to 0.70, respectively. This does not include 2.5% boric oxide added to the reaction mixture as shown above.

Reaction conditions:
  Hot zone temperature ° C. 2175
  Rate in./hr. 7
  Retention time hrs. 7

The zirconium oxide bubbles were intimately mixed with the remaining ingredients and passed through a kiln at the reaction conditions listed above. The yield of zirconium boride was 113 pounds, 66.9% of the total weight of the feed mixture. The product was in the form of well sintered silvery-grey bubbles and had a product analysis as follows:

| | Percent |
|---|---|
| Zr | 78.23 |
| B | 20.20 |
| C | 0.75 |
| Fe | 0.27 |
| Ti | 0.33 |
| N | 0.02 |
| Total | 99.80 |
| Zr+B | 98.43 |

The zirconium boride bubbles produced in Examples 1 and 2 may be used as specific high temperature insulating materials. Also, this material may be used as a chemical intermediate, for example in the simultaneous production of zirconium tetrachloride and boron trichloride by chlorinating zirconium boride at a temperature of about 1000° C. The coarse grade bubbles will chlorinate well, either in a static bed or a fluidized bed, without the costly preparation of grit sizes.

With reference to the production of zirconium carbide, I have found that an intimate mixture of zirconium oxide bubbles and a source of carbon may be heated in the absence of air at a temperature between about 2020° and 2175° C. for from 3 to 8 hours. The reaction in a high frequency furnace is preferably conducted in an inert atmosphere, e.g., an atmosphere of argon, but in a tray kiln, the atmosphere is the carbon monoxide produced by the reactants. The resulting zirconium carbide is of substantial purity and still in the bubble form. As in the production of zirconium boride, zirconium carbide may be produced by a batch process or a continuous process. In each process, the resulting zirconium carbide is of a high degree of purity and in the form of bubbles.

Example 3

Mixture: Percent by weight
  Zirconium oxide bubbles (T6) 74.3
  Petroleum coke (T44) 25.7

Since the coke does not always have the same fixed carbon content, the desired mixture of oxide to coke is established by a carbon factor range of 0.224 to 0.233, where carbon factor is defined as:

$$C.F. = \frac{\text{Fixed carbon in coke}}{\text{Fixed carbon in coke} + ZrO_2}$$

An intimate mixture was prepared of the above ingredients. The mixture had a total weight of 224 pounds and was divided and placed in seven trays loaded vertically in a high frequency furnace, each tray containing 32 pounds of the mix. The furnace took a total time of four hours and 18 minutes to come up to a temperature of 2150° C. The mixture was held at a temperature varying between 2130° and 2155° C. for 3 hours. An argon atmosphere was maintained during the entire heating cycle and until the furnace was relatively cool. The top vent of the furnace was kept covered after the heavy flaming had subsided and during the cooling period. The total weight of the product was 136¼ pounds, broken down into the following weights and analyses:

| Tray No. | Weight of Product, lbs. | Chemical Analysis | | | |
|---|---|---|---|---|---|
| | | Zr | C | N | Zr+C |
| 1 (top) | 18½ | 85.13 | 11.95 | 0.87 | 97.0 |
| 2 | 19½ | | | | |
| 3 | 19½ | | | | |
| 4 | 19½ | 86.68 | 11.40 | 0.39 | 98.08 |
| 5 | 19½ | | | | |
| 6 | 20½ | 87.11 | 11.68 | 0.31 | 98.79 |
| 7 (bottom) | 19½ | | | | |
| | 136¼ | | | | |

The top tray was partially oxidized and nitrided due to slight air leakage into the furnace. The lower trays were effected to a lesser extent.

Example 4

Mix No. 1: Percent by weight
  Zirconium oxide bubbles (T6) 74.2
  Petroleum coke (T44) 25.8
Mix No. 2:
  Zirconium oxide bubbles (T6 on 100) 74.2
  Petroleum coke (T44) 25.8
Mix No. 3:
  Zirconium oxide bubbles (T6 on 72) 74.2
  Petroleum coke (T44) 25.8

Portions of the three mixes were loaded into 7 trays in an induction furnace in the proportions listed below.

| Tray No. | Mix No. | Mix Weight, lbs. | Product Weight,* lbs. |
|---|---|---|---|
| 1 (top) | 1 | 29¼ | 11½ |
| 2 | 2 | 29½ | 16½ |
| 3 | 1 | 30 | 17½ |
| 4 | 2 | 25¾ | 13¼ |
| 5 | 3 | 27¾ | 15½ |
| 6 | 1 | 29¼ | 16¼ |
| 7 (bottom) | | 27¼ | 14 |
| | | 193¾ | 104¾ (52.7%) |

*After high carbon pockets removed and oxide fines vacuumed off.

The furnace took a total time of 4 hours to be brought to a temperature of 2150° C. The mixes were held at this temperature for 3 hours. An argon atmosphere was used during the entire heating cycle and until the product was relatively cool. The products analyzed as follows by tray No.:

CHEMICAL ANALYSIS (PERCENT)

| | Zr | C | N | Fe | Ti | Zr+C | Total Analy'd | O* (by Diff.) |
|---|---|---|---|---|---|---|---|---|
| 1 | 83.33 | 11.49 | 1.27 | 0.31 | 0.13 | 94.82 | 96.53 | 3.47 |
| 2 | 85.16 | 11.24 | 0.78 | 0.08 | 0.16 | 96.40 | 97.42 | 2.58 |
| 3 | 85.79 | 11.18 | 0.78 | 0.15 | 0.19 | 96.97 | 98.09 | 1.91 |
| 4 | 86.23 | 11.21 | 0.87 | 0.01 | 0.17 | 97.44 | 98.49 | 1.51 |
| 5 | 86.13 | 11.03 | 0.76 | 0.04 | 0.14 | 97.16 | 98.14 | 1.86 |
| 6 | 87.59 | 11.15 | 0.54 | 0.03 | 0.14 | 98.74 | 99.45 | 0.55 |
| 7 | 87.06 | 11.23 | 0.51 | 0.04 | 0.12 | 98.29 | 98.96 | 1.04 |

*There may be traces of Ca, Al and Si present, originally present in the zirconium oxide.

Example 5

| Kiln Feed | Pounds | Percent |
| --- | --- | --- |
| Zirconium oxide bubbles (T6)<br>  $SiO$—0.05%.<br>  $Fe_2O_3$—0.03%.<br>  $TiO_2$—0.02%. | 99 | 73.3 |
| Petroleum Coke<br>  Fixed Carbon—83.65%.<br>  Volatile material—13.57%.<br>  Ash—0.38%.<br>  Water—2.40%. | 36 | 26.7 |

Reaction conditions:

| | |
| --- | --- |
| Hot zone temperature ° C__ | 2175 |
| Rate ″/hr__ | 7 |
| Retention time hrs__ | 7 |

The zirconium oxide bubbles and coke were thoroughly mixed and passed through a kiln at the reaction conditions listed above. The 84 pounds of product (62.2% of the weight of the mix) was made up of a 13 pound bottom layer of semi-sintered shells easily separated by hand crushing, and a 71 pound top layer of loose shells. The product analyzed as follows:

| Layer | Chemical Analysis (Percent) | | | | | | |
| --- | --- | --- | --- | --- | --- | --- | --- |
| | Zr | C | N | Fe | Ti | Zr+C | Total |
| Top | 86.87 | 9.22 | 1.53 | Trace | 1.18 | 96.09 | 98.80 |
| Bottom | 85.48 | 13.25 | 1.11 | Trace | 0.44 | 98.73 | 100.28 |
| Composite | 85.7 | 12.6 | 1.2 | Trace | 0.6 | 98.3 | 100.1 |

The zirconium oxide was converted to the carbide without significantly altering the physical characteristics of the original bubbles. This may be shown by a comparison of the screen analyses of the oxide and carbide.

COMPARISON OF SCREEN ANALYSES

| | $ZrO_2$ bubbles (T6) | ZrC bubbles |
| --- | --- | --- |
| Screen size: | | |
| on 10 | 17.2% | |
| on 14 | | 29.0% |
| on 18 | 29.2% | |
| on 24 | | 20.9% |
| on 44 | 29.3% | 22.8% |
| on 72 | | 12.5% |
| on 100 | 18.5% | 5.0% |
| T 100 | 5.8% | 9.8% |

The higher purity top layer of the product of this example was screened into 4 fractions and each fraction was separately analyzed to see whether impurities were being concentrated in any of the fractions. The results are as follows:

| | Portion by wt. | Chemical Analysis (Percent) | | | | | | |
| --- | --- | --- | --- | --- | --- | --- | --- | --- |
| | | Zr | C | Fe | N | Ti | Zr+C | Total |
| Fraction: | | | | | | | | |
| on 14 | 29.0% | 86.55 | 10.47 | 0.04 | 1.11 | 0.22 | 97.02 | 98.39 |
| on 44 | 43.7% | 86.53 | 10.50 | 0.11 | 1.01 | 0.25 | 97.03 | 98.40 |
| on 100 | 17.5% | 81.73 | 14.66 | 0.04 | 1.08 | 0.32 | 96.39 | 97.83 |
| T100 | 9.8% | 75.43 | 19.36 | 0.29 | 1.03 | 0.73 | 94.79 | 96.84 |

The results above indicate that there are more impurities—particularly unreacted carbon and zirconia—in the finer fractions. Better reaction could be obtained at a higher temperature but there would be a risk of sintering the bubbles together. It is preferable, therefore, that the bubbles of zirconium oxide which pass a 100 mesh screen be screened out prior to reaction.

What is claimed is:

1. A method for the production of zirconium refractory material selected from the group consisting of zirconium boride and zirconium carbide, said method comprising providing zirconium oxide in the form of bubbles, forming a mixture of the bubbles and a member selected from the group consisting of (1) elemental carbon, and (2) elemental carbon with a source of boron selected from the group consisting of boron carbide and boron oxide and mixtures thereof, heating said mixture at a temperature between about 2000° and 2300° C. for a time sufficient to convert the zirconium oxide to said zirconium refractory material, and recovering said zirconium refractory material still in the bubble form.

2. The method according to claim 1 wherein the zirconium oxide bubbles are of a size to pass through a 6 mesh screen.

3. A method for the production of zirconium boride which comprises providing zirconium oxide in the form of bubbles, forming a mixture of the bubbles with a source of boron and a source of carbon, heating the mixture at a temperature between about 2000° and 2300° C. for from about 5 to about 8 hours, and recovering said zirconium boride still in the bubble form.

4. The method according to claim 3 wherein the zirconium oxide bubbles are of a size to pass through a 6 mesh per inch screen and be retained on a 100 mesh screen.

5. The method according to claim 3 wherein the source of boron is boron carbide and the source of carbon is petroleum coke.

6. The method according to claim 5 wherein the mixture is heated at a temperature of about 2200° C. for about 6 hours.

7. The method according to claim 3 wherein the source of boron is a mixture of boron carbide and boric oxide and the source of carbon is petroleum coke.

8. The method according to claim 7 wherein the mixture is heated at a temperature of about 2175° C. for about 7 hours.

9. A method for the production of zirconium carbide which comprises providing zirconium oxide in the form of bubbles, forming a mixture of the bubbles and a source of carbon, heating the mixture in the absence of air at a temperature between about 2020° and 2175° C. for from 3 to 8 hours, and recovering the zirconium carbide still in the bubble form.

10. The method according to claim 9 wherein the zirconium oxide bubbles are of a size to pass through a 6 mesh screen.

11. The method according to claim 9 wherein the source of carbon is petroleum coke.

12. The method according to claim 9 wherein the mixture is heated in an inert atmosphere.

13. The method according to claim 12 wherein the inert atmosphere is an argon atmosphere.

14. The method according to claim 13 wherein the mixture is heated at a temperature between about 2130° and 2155° C. for about 3 hours.

15. The method according to claim 13 wherein the mixture is heated at a temperature of about 2175° C. for about 7 hours.

References Cited

UNITED STATES PATENTS

| | | | |
| --- | --- | --- | --- |
| 1,871,793 | 8/1932 | Horsfield | 23—142 |
| 3,175,918 | 3/1965 | McGahan et al. | |
| 656,353 | 8/1900 | Jacobs | 23—204 |
| 948,190 | 2/1910 | Strauss | 23—204 |
| 2,656,278 | 10/1953 | Ballard et al. | 106—52 |

OTHER REFERENCES

Kieffer et al., "Zeitschrift fur Anorganische und Allgemeine Chemie," volume 268, pages 191–200 (1952).

MILTON WEISSMAN, *Primary Examiner.*

MAURICE A. BRINDISI, *Examiner.*